US012033459B2

(12) United States Patent
Kitagaki et al.

(10) Patent No.: US 12,033,459 B2

(45) Date of Patent: Jul. 9, 2024

(54) TABLE GAME DEVICE

(71) Applicant: Sports Leisure Systems Co., Ltd., Osaka (JP)

(72) Inventors: Tomoyuki Kitagaki, Osaka (JP); Kunihiko Nishi, Osaka (JP); Takanori Nishi, Osaka (JP); Tetsuro Shimizu, Osaka (JP)

(73) Assignee: Sports Leisure Systems Co., Ltd., Osaka (JP)

( * ) Notice: Subject to any disclaimer, the term of this patent is extended or adjusted under 35 U.S.C. 154(b) by 282 days.

(21) Appl. No.: 17/606,921

(22) PCT Filed: Feb. 12, 2021

(86) PCT No.: PCT/JP2021/005243

§ 371 (c)(1),
(2) Date: Oct. 27, 2021

(87) PCT Pub. No.: WO2022/172395

PCT Pub. Date: Aug. 18, 2022

(65) Prior Publication Data

US 2023/0144768 A1 May 11, 2023

(51) Int. Cl.
*G07F 17/32* (2006.01)

(52) U.S. Cl.
CPC ........ *G07F 17/322* (2013.01); *G07F 17/3211* (2013.01); *G07F 17/3293* (2013.01)

(58) Field of Classification Search
CPC . G07F 17/322; G07F 17/3211; G07F 17/3293
See application file for complete search history.

(56) References Cited

U.S. PATENT DOCUMENTS

| | | | | |
|---|---|---|---|---|
| 7,946,912 B1 * | 5/2011 | Rennard | ............. | G07F 17/3227 463/16 |
| 2009/0075723 A1 * | 3/2009 | Richard | ................. | G06M 11/00 463/25 |

(Continued)

FOREIGN PATENT DOCUMENTS

| | | |
|---|---|---|
| JP | 2002-102529 A | 4/2002 |
| JP | 2005-334334 A | 12/2005 |

(Continued)

OTHER PUBLICATIONS

International Search Report and Written Opinion for corresponding Application No. PCT/JP2021/005243, mailed Apr. 6, 2021.

*Primary Examiner* — James S. McClellan
(74) *Attorney, Agent, or Firm* — Renner, Otto, Boisselle & Sklar, LLP

(57) ABSTRACT

A table game device includes: a chip for bet, the chip integrally including an RFID tag having identification information including a virtual value of virtual currency written to be readable; a game table having an upper face on which at least a game area and bet areas for a predetermined number of players are configured, the game area being for playing a game, the bet areas being for placing a chip to bet to a result of the game; an RFID reader in the game table opposed to each bet area, the RFID reader being configured to read the identification information from the RFID tag of the chip placed in the bet area; and a projector disposed in a space above the game table and configured to project a game board image on the upper face of the game table to correspond to the game area and the bet areas.

12 Claims, 7 Drawing Sheets

(56) References Cited

U.S. PATENT DOCUMENTS

| | | | | |
|---|---|---|---|---|
| 2009/0088243 | A1* | 4/2009 | Gagner | G07F 17/322 463/25 |
| 2010/0298051 | A1* | 11/2010 | Loose | G07F 17/32 463/35 |
| 2011/0115158 | A1* | 5/2011 | Gagner | G07F 17/322 463/31 |
| 2013/0217474 | A1* | 8/2013 | Yang | G07F 17/322 463/25 |
| 2016/0328913 | A1* | 11/2016 | Blazevic | G07F 17/3211 |
| 2019/0073855 | A1 | 3/2019 | Moore | |
| 2020/0105087 | A1 | 4/2020 | Keda | |
| 2021/0090379 | A1* | 3/2021 | Takine | G07F 17/3241 |

FOREIGN PATENT DOCUMENTS

| | | | |
|---|---|---|---|
| JP | 2006-110114 | A | 4/2006 |
| JP | 2018-130183 | A | 8/2018 |
| JP | 2019-198651 | A | 11/2019 |
| JP | 2020-121166 | A | 8/2020 |
| WO | 2015-104803 | A1 | 7/2015 |

* cited by examiner

TABLE GAME DEVICE

TECHNICAL FIELD

The present invention relates to a table game device that is used for a casino game, for example, played on a table.

BACKGROUND ART

Some of the casino games played on a table in game facilities use chips. Recently the authenticity of these chips and the fraudulent acts caused by the fake chips have posed problems, and various countermeasures have been taken. Patent Literature 1 describes a game machine that uses a medal having a radio frequency identification (RFID) tag embedded, and the RFID tag contains the identification information recorded in advance. This game machine is configured to read the identification information of a medal inserted in the medal slot with a reader installed at the slot, and compare the read identification information with the information registered in the ROM in advance to determine whether the medal is a real one or not. Patent Literature 2 describes a management system for a game facility such as a casino. Each of the chips used has a wireless IC (RFID) tag that records information to let the system know the number and total amount of the chips bet in the game, and the system includes an IC tag reader that is installed under the game table to read the recorded information.

Patent Literature 3 describes a game system to implement an electronic table game. The system includes a projector in the space below a transparent table board. The projector projects a game board image toward the lower face of the table board, and the game system manages a game that uses chips placed on the table board corresponding to the projected image.

CITATION LIST

Patent Literature

Patent Literature 1: Patent Application Publication No. 2006-110114

Patent Literature 2: Patent Application Publication No. 2020-121166

Patent Literature 3: US2020105087A1

SUMMARY OF INVENTION

Technical Problem

Patent Literature 1 simply detects the authenticity of medals passing through the slot. This literature does not describe the technique of identifying the types of medals stacked as a pile in a bet area on the game table to calculate the total amount of the medal value for each player. The system of Patent Literature 2 further includes a surveillance camera above the game table because the IC tag reader under the game table fails to read the total amount of the bet chip value accurately. The system then acquires the total amount of the chips by identifying the types and the number of the chips through the analysis of the image taken by the camera.

In Patent Literature 3, the projector in the space below the table board projects an image on the lower face of the table board. To allow the player to view the image from the above of the upper face of the table board, the table board has to be made of a material that transmits light, such as glass, and accordingly has a complicated and special structure. A chip sensor may be placed on the lower face of the table board. This chip sensor will block the projected light and interrupt the image, and also cause a problem in appearance. A surveillance camera may be placed above the table board to take an image of the table surface. In this case, the camera will face the light from the projector, and the projected light may enter the surveillance image. This can inhibit the high-precision image analysis. To cope with the problem, the system of Patent Literature 3 can be improved to include both the projector and the surveillance camera placed above the table board. This configuration, however, poses a problem of the appearance.

In view of the above, the present invention provides a table game device with a simple configuration, including an electronic game table that does not affect the chip identification process.

Solution to Problem

A table game device according to the present invention includes: a game table having an upper face on which at least a game area and bet areas for a predetermined number of players are configured, the game area being for playing a game, the bet areas being for placing a chip to bet to a result of the game, the chip integrally including an RFID tag having identification information n including a virtual value of virtual currency written to be readable; an RFID reader disposed below the upper face of the game table to be opposed to each bet area, the RFID reader being configured to read the identification information from the RFID tag of the chip placed in the bet area; and a projector disposed in a space above the game table, the projector being configured to project a game board image on the upper face of the game table so as to correspond to the game area and the bet areas.

A table game device according to the present invention includes: a chip for bet, the chip integrally including an RFID tag having identification information including a virtual value of virtual currency written to be readable; a game table having an upper face on which at least a game area and bet areas for a predetermined number of players are configured, the game area being for playing a game, the bet areas being for placing the chip to bet to a result of the game; an RFID reader disposed below the upper face of the game table to be opposed to each bet area, the RFID reader being configured to read the identification information from the RFID tag of the chip placed in the bet area; and a projector disposed in a space above the game table, the projector being configured to project a game board image on the upper face of the game table so as to correspond to the game area and the bet areas.

According to these aspects of the invention, the identification information of chips placed in the bet areas on the game table is automatically read by the RFID readers located at a lower part of the game table. The present invention also enables detection of the virtual value from the read identification information, and necessary verification of authenticity. The projector located above projects a game board image on the game table, so that the game table functions as an electronic game table. On the game table, only the chips are placed, and no obstacles to block the projected light are on the table. In this way, the present invention provides a table game device with a simple configuration, including an electronic game table that does not affect the identification process of the bet chips.

Advantageous Effects of Invention

The present invention provides a table game device with a simple configuration, including an electronic game table that does not affect the identification process of bet chips.

BRIEF DESCRIPTION OF DRAWINGS

FIG. 2A is a perspective view of the game table having RFID readers embedded, and FIG. 2B is a view taken along the arrow B-B'.

FIG. 3A shows a game board image for a blackjack game and FIG. 3B shows a game board image for a baccarat game.

FIG. 4A shows an RFID reader having a rectangular shape in a plan view, and FIG. 4B shows an RFID reader having a circular shape in a plan view.

FIG. 5A is a plan view, FIG. 5B is a view taken along the arrow B-B', and FIG. 5C is a view taken along the arrow B-B' showing another embodiment.

DESCRIPTION OF EMBODIMENTS

Figure 1:
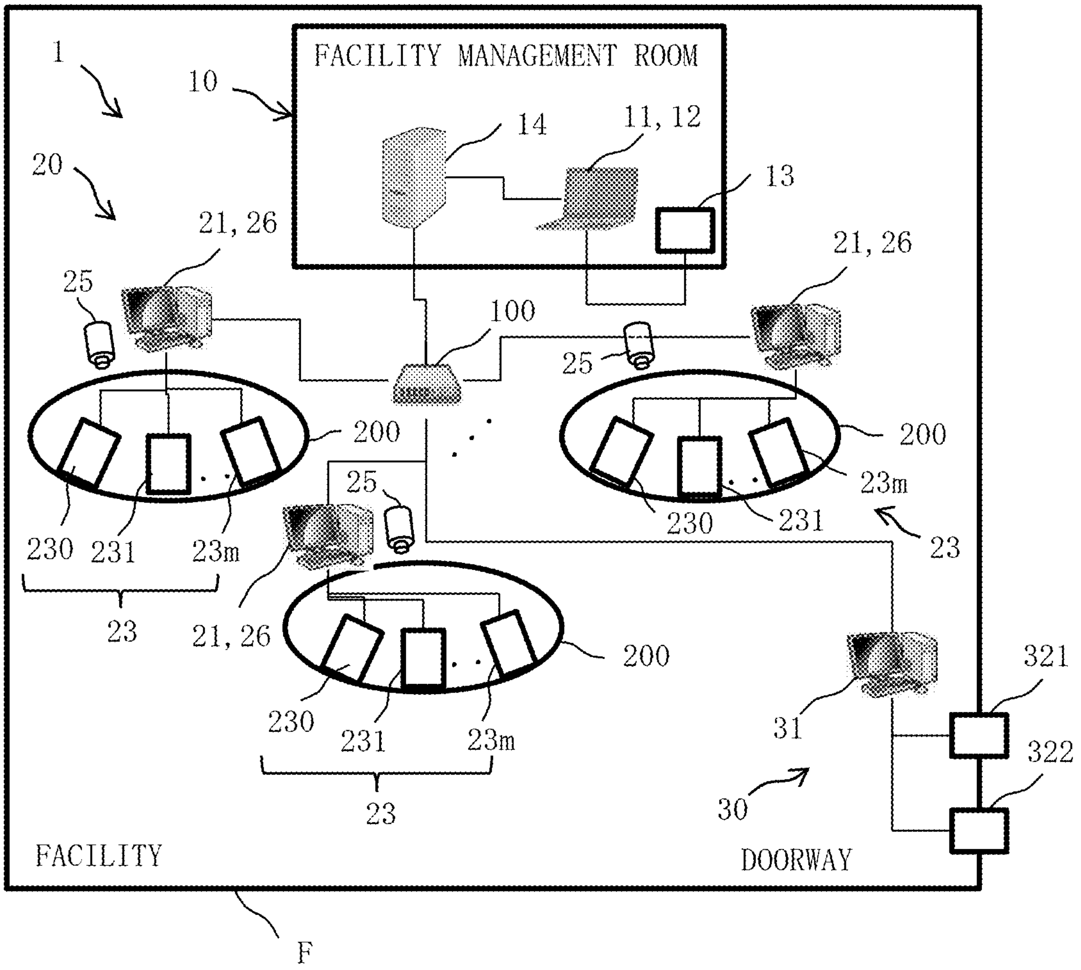
FIG. 1 schematically shows the overall configuration of one embodiment of a game system including a predetermined number of table game devices according to the present invention.

FIG. 1 schematically shows the overall configuration of one embodiment of a game system 1 including a predetermined number of table game devices 20 according to the present invention. In one example, facility F is a game arcade, in which one or more table game devices 20 for business use are installed. In facility F, a facility management unit 10 that manages and operates each of the table game devices 20, and an entry/exit monitoring unit 30 that monitors the doorway in facility F are installed via a hub 100. The facility management unit 10 includes controller 11 having a processor (CPU) to execute information processing and a display 12 connected to the controller 11 as well as an RFID reader 13 and a server 14 that are described later. The entry/exit monitoring unit 30 includes a controller 31 having a processor (CPU) to execute information processing, and RFID readers 321 and 322 that are described later. The details of the facility management unit 10 and the entry/exit monitoring unit 30 will be described later.

Each table game device 20 includes a game table 200 made of a material that transmits electromagnetic waves, and a controller 21 at an appropriate position or in the vicinity of the game table to progress a game and process a game result. The table game device 20 also includes a display 26 as needed. The game table 200 includes a predetermined number of RFID reader (s) 23, including an RFID reader 230, an RFID reader 231, . . . 23*m*. At an appropriate position, preferably at a center and above the game table 200, a projector 25 is placed to project an optical image onto the upper face of the game table 200. In one mode, the projector 25 may be suspended from the ceiling of the facility or be attached via a support column erected on the floor. The optical image is preferably a color image, which is a static image that shows graphics of the game board. As needed, the optical image also includes a static image and a dynamic image according to the progress of the game or for a dramatic effect (hereinafter an image of this type is called an effect image).

The table game device 20 is applicable to all games played on the board of the game table 200, such as a blackjack game, a baccarat game, and a poker game. These games are played using a plurality of types of cards with different scores to decide the winning or losing according to a predetermined game rule. The table game device 20 is configured to make a bet using a chip as a substitute for virtual currency about the winning or losing of a game. Depending on the winning or losing, that is, if the player loses, the dealer, i.e., the facility F collects the bet amount. If the player wins, a predetermined virtual value corresponding to the bet will be redeemed (refunded) to the player.

Figure 2A:
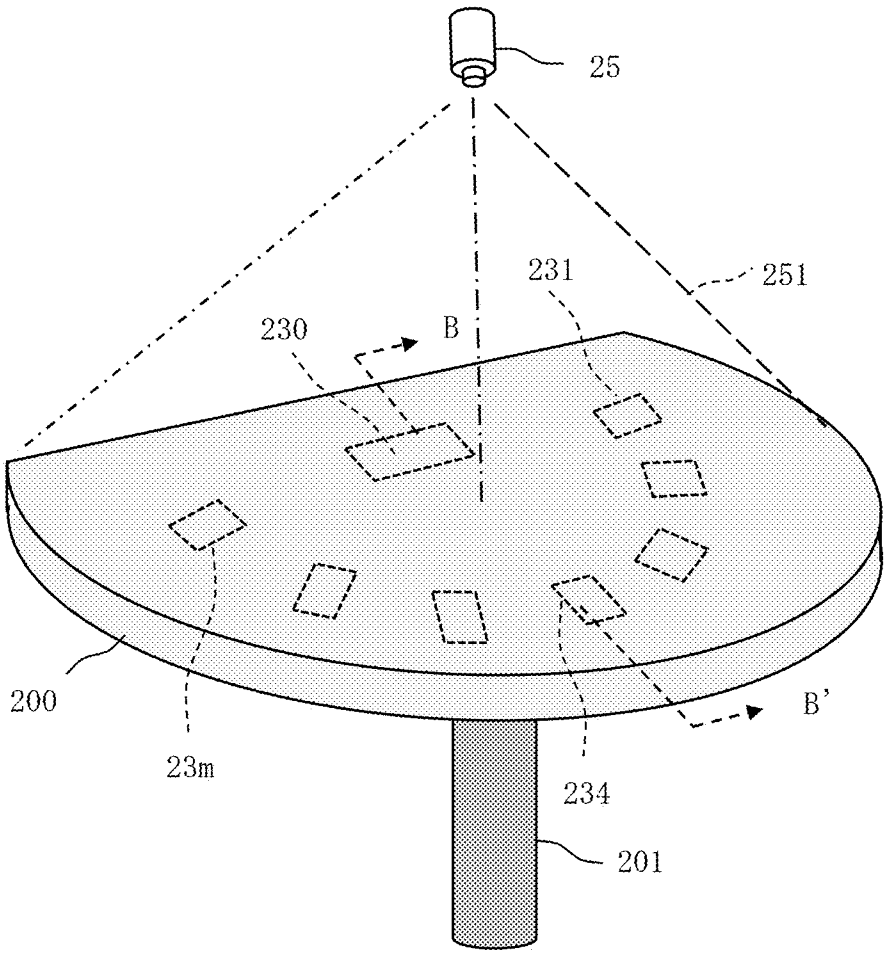
FIG. 2A and FIG. 2B show one example of a game table, where

The game table 200 has a board having a predetermined shape and thickness. In one example, this may be a part of an elliptical shape as shown in FIG. 2A or have another shape. The game table 200 is supported at a predetermined height position by a support column 201, for example. The game table 200 is colored in green, white, and other colors, or is in single color, instead of the conventional game table having graphics on the surface according to the type of a game. The game table 200 has a board surface of a material that appropriately reflects the projected light.

The projector 25 projects an optical image, a game board image corresponding to the type of a game from the space above the game table 200 toward the board surface and displays the image there, and makes the game table 200 function as an electronic game table.

Figure 3A:
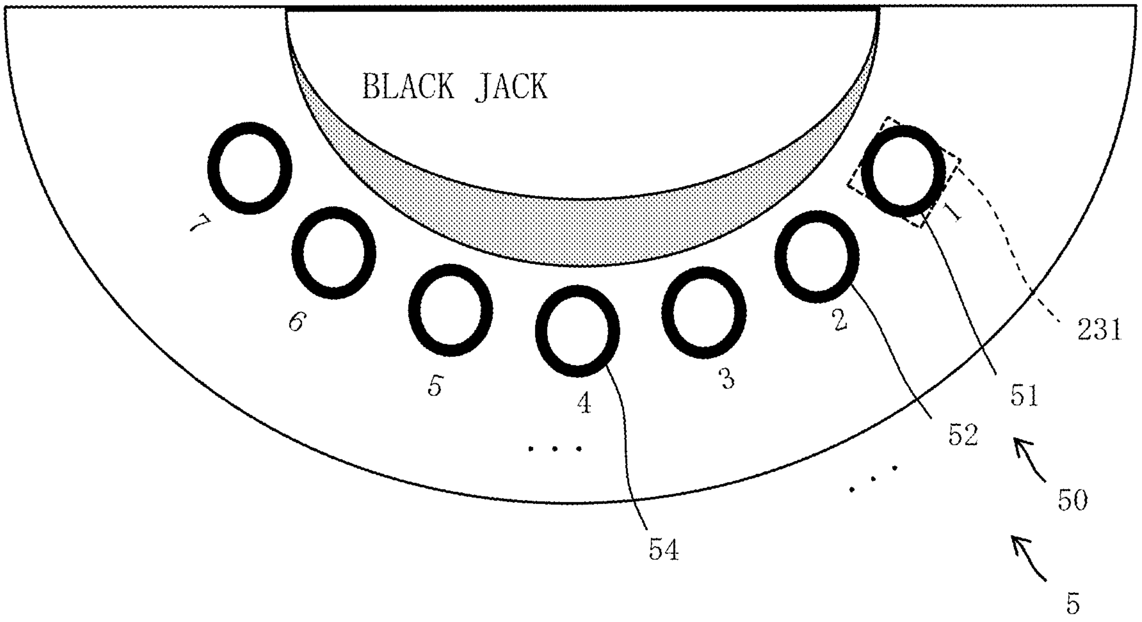
FIG. 3A and FIG. 3B show an example of an image that represents game board graphics, where
Figure 3B:
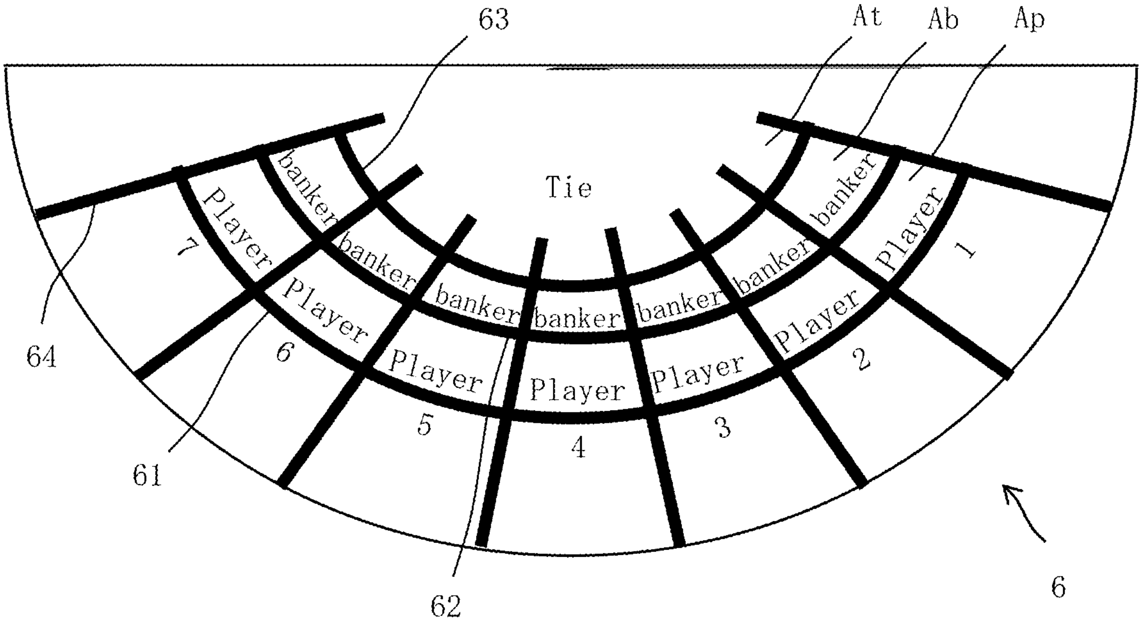

FIG. 3A and FIG. 3B each are an example of an optically projected image that can be displayed on the board surface of the game table 200 of FIG. 2A. FIG. 3A shows a game board image 5 for a blackjack game and FIG. 3B shows a game board image 6 for a baccarat game. In FIGS. 3A and 3B, the edge along the straight line (upper edge of these figures) corresponds to the standing position of the dealer, and the arc of the ellipse corresponds to the standing position of the player (s).

The game board image 5 in FIG. 3A shows an image of bet areas having marks 50 (51, 52, . . . ) arranged in the circumferential direction of the ellipse, each of the marks having a predetermined shape such as a circle, an image of the numbers 1 to 7 corresponding to the marks 51, 52 . . . , and an image of appropriate graphics in a game area close to the standing position of the dealer. Players can participate in the blackjack game by placing their own chips in the bet areas corresponding to the vacant number positions. At the position of each mark 51, 52 . . . , an RFID reader 231 described later is disposed opposite to the game table 200 as shown in the dashed line surrounding the mark 51, for example. The RFID reader 231 reads information on the chips there.

The game board image 6 in FIG. 3B includes an image of three lines 61, 62, 63 that are concentric with the arc of the ellipse and are almost similar in shape having three sizes from small to large, an image of straight lines 64 extending radially at equal intervals in the circumferential direction centered around the standing position of the dealer, and an image of "Player", "Banker" and "Tie" that are displayed in bet areas Ap, Ab, and At, respectively, surrounded by the lines 61, 62, 63 and the straight lines 64. The game board image 6 also includes an image of numbers 1 to 7 corresponding to the outermost bet areas Ap, and an image of appropriate graphics (not shown in FIG. 3B) that is the game area close to the standing position of the dealer. Preferably, the game board images shown in FIG. 3A and FIG. 3B include a line image as a whole or in part (for example, a line image that divides the bet area) and not an image extending over the plane (plane image), so as to minimize the blockage of the projected images from above by a part of the human body such as the player or the dealer's hand. The shape of the bet area is not limited to the example of FIGS. 3A and 3B, and various shapes can be used.

Figure 2B:
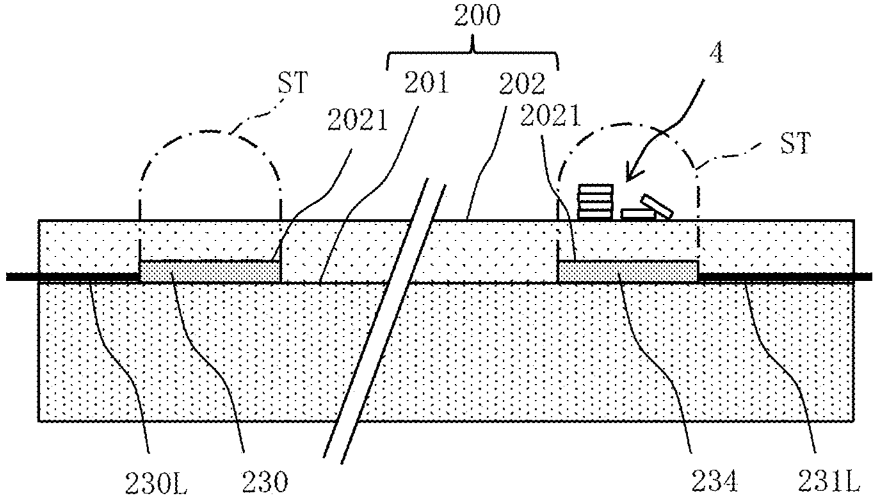

Referring back to FIG. 2A and FIG. 2B, the RFID readers 23 (230, 231 . . . , 234 . . . , 23*m*) are embedded in the game table 200. The RFID reader 230 corresponds to the place where the chip tray (not shown) is to be placed, and has a wider directional width than other RFID readers 231, . . . have. The RFID reader 230 reads the identification information of the chips 4 in the chip tray. The chip tray (not shown) temporarily stores a plurality of (in type and number) chips 4 for redeeming and collected chips 4. The chip tray is operated by the dealer to collect the chips 4 bet by the losing player or to redeem the chips 4 for the virtual value equal to the bet amount to the winning player. Each RFID reader 23 reads the information of the chips bet in the corresponding bet area. FIG. 2B shows the installation of the RFID readers 230 and 234. As shown in this embodiment, the game table 200 has the laminate of a lower layer 201 and an upper layer 202. The upper layer 202 has a recess 2021 on the lower face that stores the RFID readers 23 and the lead wire. This configuration enables easy assembling of a game table simply by replacing the upper layer 202 according to the game type.

Figure 4A:
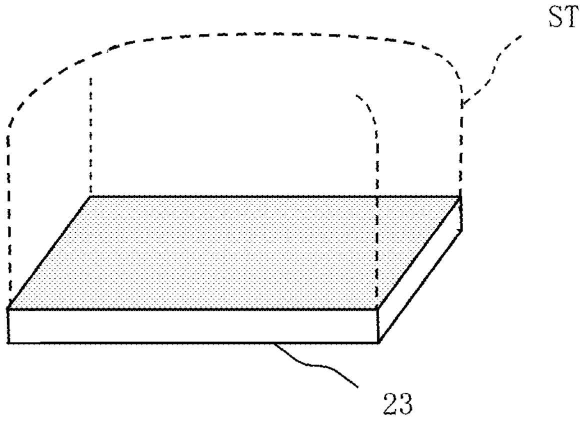
FIG. 4A and FIG. 4B show an RFID reader and its directivity, where
Figure 4B:
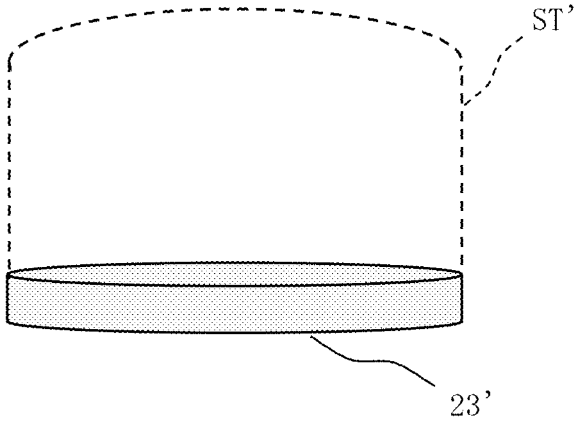

An image of the mark 50 indicating the bet area is displayed above the RFID reader 23, and as illustrated in FIG. 2B, chips 4 bet by the player are stacked at that position. As shown in FIG. 2B, the directivity ST of short-waves to UHF waves used for the RFID reader 23 preferably has a directivity angle of ±90°. In the present embodiment, the directivity of the RFID reader 23 is set at ST, ST' of ±90° for both of FIG. 4A having the emitting surface of the RFID reader 23 that is rectangular in plan view and FIG. 4B having the emitting surface of the RFID reader 23' that is circular in plan view. Note here that the directivity (directivity angle) does not have to be exactly±90°, but may be narrower or wider than that.

Figure 5A:
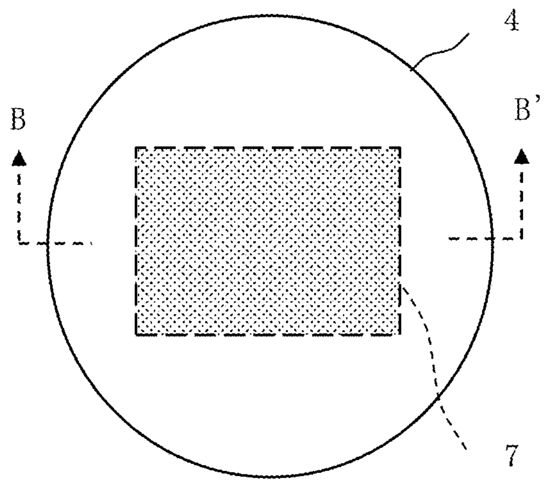
FIG. 5A, FIG. 5B, and FIG. 5C show the structure of a chip, where
Figure 5B:
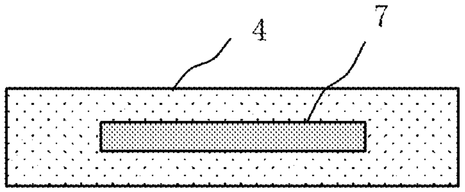
Figure 5C:
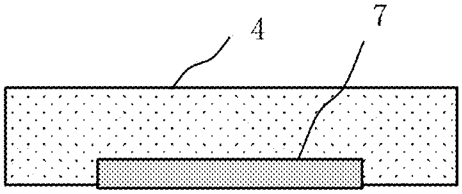

FIG. 5A, FIG. 5B, and FIG. 5C show the structure of the chip 4. FIG. 5A is a plan view, FIG. 5B is a view taken along the arrow B-B', and FIG. 5C is a view taken along the arrow B-B' showing another embodiment. The chip 4 has a disk shape (medal shape) and is mainly made of a clay material or a resin material. The chip may be made of resin by compression-molding so that it appears heavy, if required. In one example, the chip 4 may have an RFID tag 7 having a cuboid shape embedded (FIG. 5B), or may have such an RFID tag 7 attached or stored with one surface of the tag exposed on the back side of the chip 4 (FIG. 5C). The RFID tag 7 includes a memory that stores identification information, and the stored information is read in a non-contact manner via radio waves when the chip 4, that is, the RFID tag 7 is brought close to the RFID reader 23.

The RFID tag 7 and the RFID reader 23 are known techniques, and are briefly described below. The RFID tag 7 includes at least a memory, a power generation unit, and an antenna unit. The RFID reader 23 includes at least an antenna, a transmitter/receiver, and a signal processor. The transmitter/receiver of the RFID reader 23 supplies power to the power generation unit of the RFID tag 7, reads the identification information stored in the memory, and executes predetermined signal processing of the read signal.

The memory of the RFID tag 7 stores identification information including individual attributes of the chip 4 to be integrated with the RFID tag 7 to identify the chip 4. The identification information is written by an external specialist, for example. In one example, the identification information includes production information of the chip 4, which is virtual currency for games, casino information, virtual value information indicating the type of the chip, and a serial number. The virtual value information is multiple types of numerical information, such as $1, . . . $10, . . . $100, . . . $10,000.

The signal processor of the RFID reader 23 executes reproduction processing of the received identification information and batch read processing (anti-collision). The batch read processing is a known technology, and identifies each of a plurality of RFID tags 7 coexisting in the directivity range of radio waves based on a time-slot data processing technology, for example.

Figure 6:
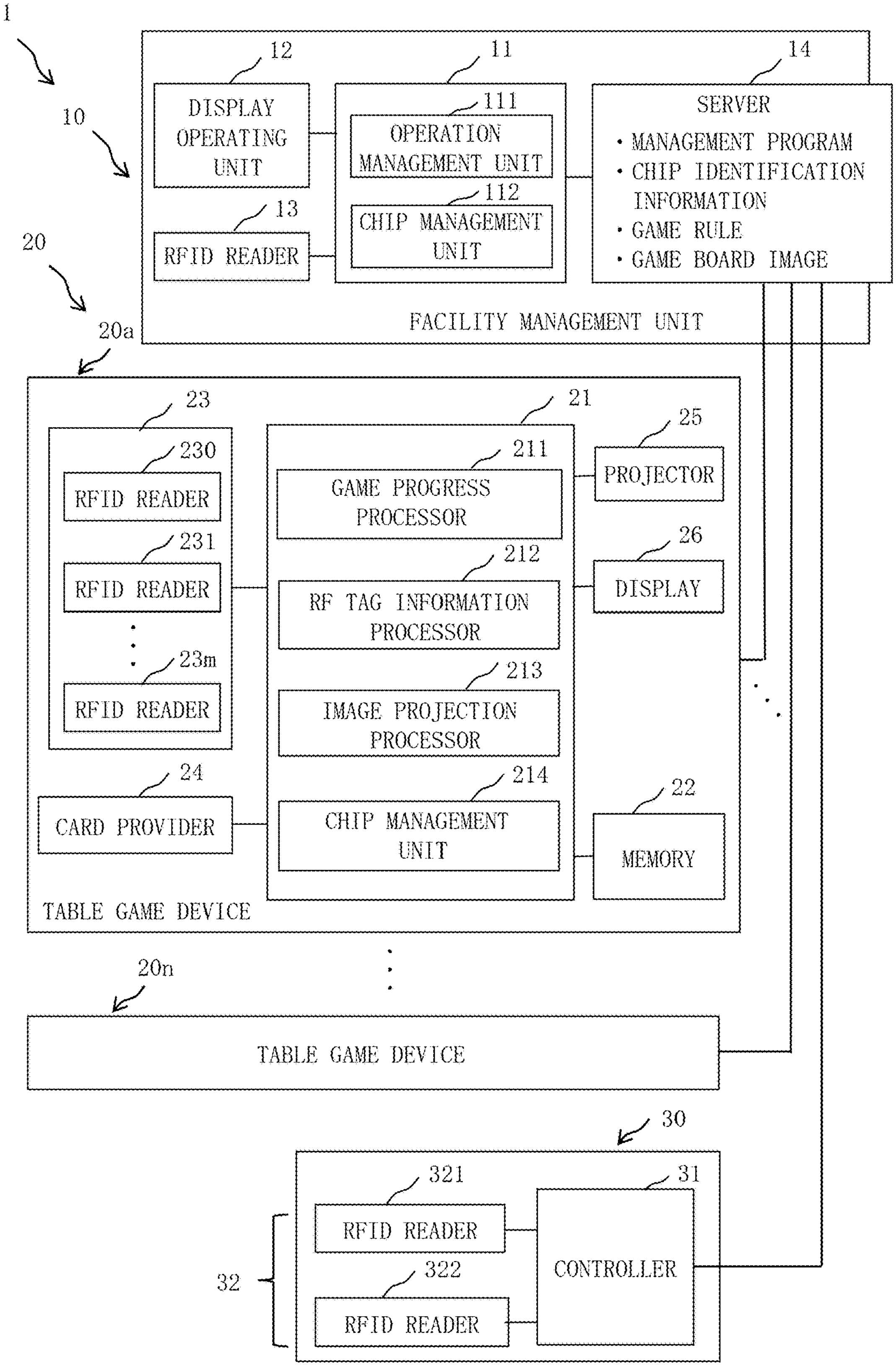
FIG. 6 shows the functional configuration of one embodiment of a game system including a table game device according to the present invention.

Next, referring to FIG. 6, the following describes the functional configuration and the operation of various parts of the game system 1. The facility management unit 10 is connected to all of the table game devices 20 in the facility F to be communicable by wire or wireless, and comprehensively manages the game status, game result information, and chip status of each table game device 20 and also constantly manages the monitoring result of the entry/exit monitoring unit 30.

Receiving chips 4 delivered from an external specialist, for example, the RFID reader 13 in the facility management unit 10 reads the identification information written in the memory of the RFID tag 7 of each chip 4 in advance. The server 14 stores (registers) the read identification information. Registering the identification information associates at least the serial number of the chip 4 with the virtual value information. The identification information is used as the registration information on all of the chips 4. This identification information is then read later by the table game devices 20 and the entry/exit management unit 30 to verify the authenticity of the chips 4 and recognize the location (table game devices 20, RFID readers 23, 32) of the chips 4.

In addition to the identification information, the server 14 stores a management program that manages the operation of the entire facility F, game rules, game board images (see FIG. 3A and FIG. 3B), and various types of effect images (used for during the games or during the game pause). The server 14 also acquires information about the game from each table game device 20 and information read by the entry/exit monitoring unit 30 for storage.

The controller 11 executes the management program in the server 14 to function as an operation management unit 111 and a chip management unit 112. The operation management unit 111 manages the game progress and the game result according to the card information on the dealer and the card information on each player that are taken from the table game device 20, the total virtual value of the chips bet by each player, and the game rule. Information on the progress of the game contains the game rule, information on the operation by the dealer, and the information read from a known card provider 24 (see FIG. 6). The card provider 24 is called a shoe, and has a function of drawing cards used in the game, and scanning the images on the cards during the drawing to read the scores (typically the scores indicated on the playing cards: numbers A, 1, . . . 10, J, . . . K). In the mode of using the card provider 24, the winning or losing of the game can be automatically determined by the game rule based on the read information.

The chip management unit 112 reads the identification information of the chips 4 bet in the bet areas 50, and executes the authenticity determination process and the calculation process of the virtual value. Once the virtual value in each bet area is calculated, the projector 25 projects an image of the virtual value at a predetermined position near the corresponding bet area 50 to display it on the table board.

Figure 7:
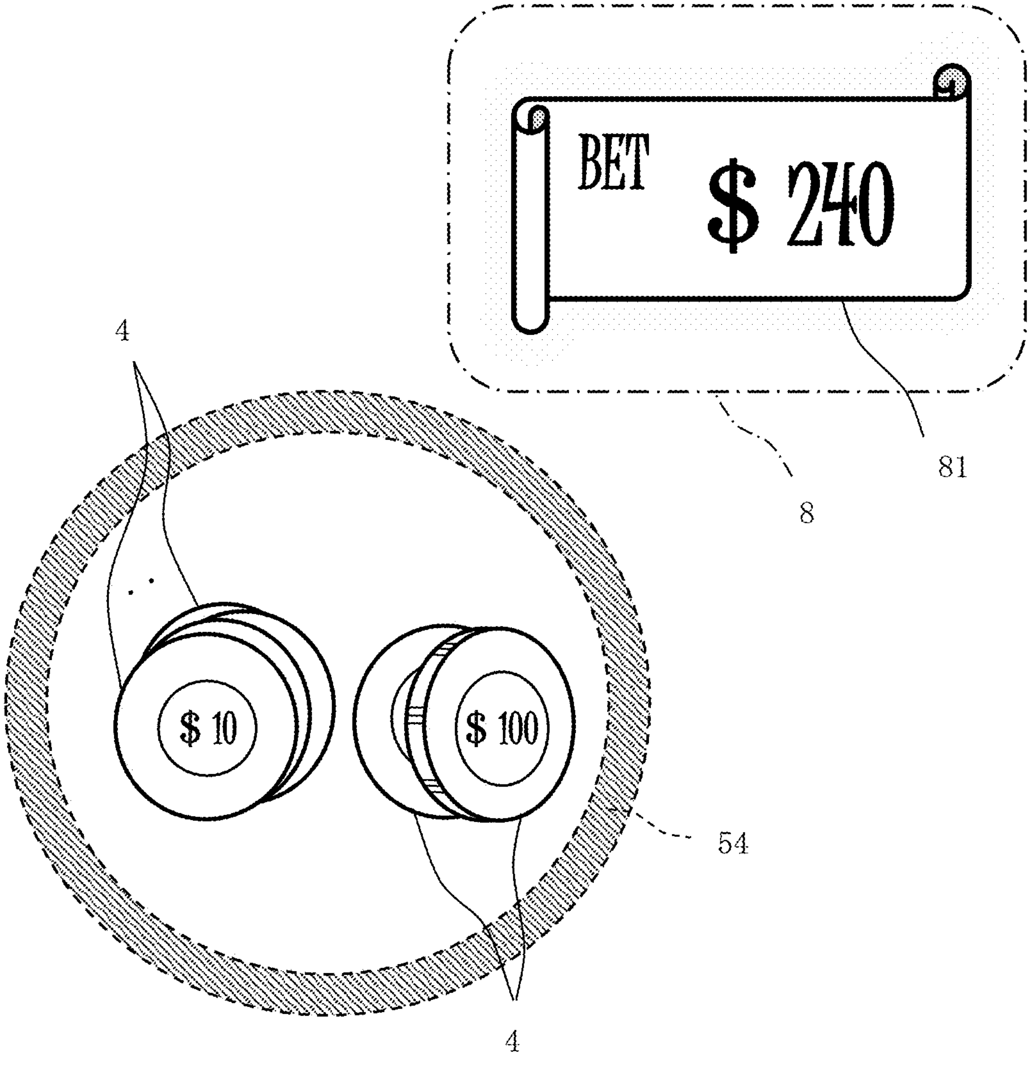
FIG. 7 shows an example of an effect image of the total virtual value of bet chips.

FIG. 7 shows an example of the image that displays an effect image of the total virtual value of the chips 4. This corresponds to FIG. 2B, and four chips 4 each marked with a virtual value of $10 are stacked in the bet area 54 and two chips 4 each marked with a virtual value of $100 are stacked next to them. In response to the completion of reading of the chips 4 by the RFID reader 23, the projector 25 projects a visible effect image 81 of the total virtual value calculated by the chip management unit 112 at a predetermined region 8 corresponding to the bet area 54. This visual effect of the image 81 enhances the attraction of the game. The operation management unit 111 may also display an effect image according to the progress of the game. Or in response to the decision of the winner or loser, the operation management unit 111 may display an effect image for a winner or a loser depending on whether the player is the winner or the loser.

The entry/exit monitoring unit 30 detects unauthorized activity of the players, such as taking the chips 4 from the facility or bringing in fake chips, and issues a necessary warning (e.g., displaying a warning or outputting a warning sound by a warning unit not shown). To this end, a required number (one or more) of RFID reader (s) 32 may be placed in the appropriate positions in the passage of the doorway to effectively detect the authenticity of the chips. The information read by the RFID reader (s) 32 is transmitted to the server 14 of the facility management unit 10 by wire or wirelessly, and is determined by the chip management unit 112. Then the chip management unit 112 issues a warning, designates the read identification information as unauthorized chip information, or discards the chip. In the present embodiment, RFID readers 321 and 322 are placed on the left and right of the doorway, respectively, that is, on the exit passage and the entrance passage, respectively, so as to detect unauthorized taking-out and carrying-in of the chips. Depending on the size of the doorway, the required number of RFID readers may be placed on the ceiling and on the floor. To detect fake chips, a plurality of RFID readers may be configured to redundantly detect the chips.

The present embodiment includes a plurality of table game devices 20, and the following assumes the case of a single type of the game played with these devices, and describes the table game device 20*a* as an example.

The table game device 20*a* includes a controller 21 having a processor (CPU). To the controller 21, a memory 22, a plurality of RFID readers 23, a card provider 24, a projector 25, and a display 26 are connected. The memory 22 includes a memory area in which a game program of a table game to be executed, table game rules and other information are installed from the server 14, and a work area for data processing.

For the plurality of RFID readers 23, eight RFID readers 230, 231 . . . 23*m* are embedded in the game table 200 as shown in FIG. 2A or placed on the back side, for example. The number of RFID readers 23 varies with the type of game to be assumed. In one example, for the baccarat game of FIG. 3B, each player occupies three bet areas, that is, three RFID readers are required. Each RFID reader 23 in the facility F has a unique ID such as a serial number, and is connected to the controller 21 by wire or wireless so as to be communicable. The controller 21 identifies the RFID reader 23 that is a sender of information because the ID information unique to the RFID reader 23 is added to the communication.

The table game device 20*a* includes the card provider 24 as needed, which may be a card reader (shoe) described above. In the mode of including the card provider 24, the device is able to determine the game result.

The table game device 20*a* may include the display 26 as needed. In addition to the projection of a game board image and an effect image on the table board by the projector 25, the display 26 displays an effect image, for example. The display 26 may be an image display having a flat screen or a known stereoscopic image display that draws an image in the air for signage. For the latter case of signage, the image in the air is placed at a suitable space above the board of the game table 200 to present the image to the player.

The controller 21 executes a game program, for example, to function as a game progress processor 211, an RF tag information processor 212, an image projection processor 213, and a chip management unit 214.

The game progress processor 211 executes the processes including the instruction to start a game by the dealer, the instruction to take in bet information, the distribution of cards and the reading of the score, the judgment of the game result, the collection of chips for each player, and the ending of processing the redeemed amount. The game progress processor 211 temporarily stores the total virtual value of the chips 4 in the bet area for each player read by the RFID reader 23, and instructs the display of an effect image (see FIG. 7, for example).

The RF tag reader 212 reads the confirmed bets at the end of the betting period, i.e., reading the identification information of the chips 4 placed in the bet area of each player for the authenticity determination process at the server 10, and calculating the total virtual value that the player bets.

The image projection processor 213 instructs the selection of an image of the game board, various effect images during the progress of the game and at the end of the game, and the projection of the images. In one embodiment, these images may be read from the server 14. In another embodiment, the images may be read into the memory 22 in advance according to the type of game to be set, and may be read from the memory 22 during the game.

The chip management unit 214 manages the chips stored in the chip tray or collected in the chip tray based on their identification information.

In the present embodiment, the card reading operation by the card provider 24 is used as the reading-end timing of the identification information of the bet chips 4. Another embodiment may include an operating unit that the dealer can operate, in place of or in addition to the card provider 24. Then, in response to the operation with this operating unit, the reading operation of the chips 4 and other operation of displaying effect images may be instructed.

In this embodiment, information on the game rules and the game board images is stored in the server 14. In another embodiment, the information may be stored in the memory 22 of each table game device 20.

The above embodiment describes the blackjack game as an example of the table game. In another embodiment, other types of table game such as a baccarat game may be assumed. In this case, based on the information on the virtual value of the chips bet in each bet area for each player and the collection and redeeming according to the winning or losing in the game, the chips are moved. After the movement, the total virtual value of the chips stored in the chip tray can be managed.

As described above, a table game device according to the present invention preferably includes: a game table having an upper face on which at least a game area and bet areas for a predetermined number of players are configured, the game area being for playing a game, the bet areas being for placing a chip to bet to a result of the game, the chip integrally including an RFID tag having identification information including a virtual value of virtual currency written to be readable; an RFID reader disposed below the upper face of the game table to be opposed to each bet area, the RFID reader being configured to read the identification information from the RFID tag of the chip placed in the bet area; and a projector disposed in a space above the game table, the projector being configured to project a game board image on the upper face of the game table so as to correspond to the game area and the bet areas.

A table game device according to the present invention preferably includes: a chip for bet, the chip integrally including an RFID tag having identification information including a virtual value of virtual currency written to be readable; a game table having an upper face on which at least a game area and bet areas for a predetermined number of players are configured, the game area being for playing a game and the bet areas being for placing the chip to bet to a result of the game; an RFID reader disposed below the upper face of the game table to be opposed to each bet area, the RFID reader being configured to read the identification information from the RFID tag of the chip placed in the bet area; and a projector disposed in a space above the game table, the projector being configured to project a game board image on the upper face of the game table so as to correspond to the game area and the bet areas.

According to these aspects of the invention, the identification information of chips placed in the bet areas on the game table is automatically read by the RFID readers located at a lower part of the game table. The projector located above projects a game board image on the game table, so that the game table functions as an electronic game table. On the game table, only the chips are placed, and no obstacles to block the projected light are on the table. In this way, the present invention provides a table game device with a simple configuration, including an electronic game table that does not affect the identification process of the bet chips.

Preferably in the table game device, the game table has a laminate of a lower layer and an upper layer in a thickness direction, and has a recess in the upper layer to embed the RFID readers. This configuration enables easy assembling of a game table for another table game simply by replacing the upper layer.

Preferably, the projector is disposed substantially at a center and above the game table. This configuration hardly blocks the projected light from the projector by a person such as a player.

Preferably, the projector projects a line image. This configuration suppresses the projected image entering on the surface of the chips bet in the bet areas on the game table. Note that not all of the images need to be line images, and a plane image may be projected on a part of the portion other than the bed areas, for example.

Preferably, the projector displays an effect image of a total value of a bet at a position corresponding to the bet area based on the identification information read from the RF tag of one or a plurality of chips placed in the bet area. With this configuration, the total value is displayed as an effect image. This allows the player to notice betting of an erroneous amount, and also to easily see the betting status of another player.

Preferably, the RFID reader emits radio waves having a directivity of ±90°. With this configuration, the RFID reader may have a radio-wave emitting face substantially similar to that of the bet area. This means that RFID readers can be installed also for a baccarat game, in which a plurality of bet areas are close to each other.

Preferably, the table game device according to the present invention further includes: a memory that stores information for verification that is used for verification of authenticity of the identification information written in the RF tag of the chip used in the table game; and a verification unit configured to compare identification information read by the RFID reader with the information for verification stored in the memory for verification. This configuration allows the chips read by the RFID reader, that is, all of the chips used in the game to be verified for authenticity, which prevents fraudulent activity as much as possible.

REFERENCE SIGNS LIST

1 Game system
10 Facility management unit
112 Chip management unit (verification unit)
14 Server (memory)
20, 20*a*, . . . 20*n* Table game device
200 Game table
21 Controller
211 Game progress processor
212 RF tag information processor
213 Image projection processor
214 Chip management unit
22 Memory
23, 23', 32 RFID reader
25 Projector
30 Entry/exit monitoring unit
4 Chip
5, 6 Game board image
50, Ap, Ab, At Bet area
7 RFID tag
8 Effect area

The invention claimed is:

1. A table game device comprising:

a game table having an upper face on which at least a game area and bet areas for a predetermined number of players are configured, the game area being for playing a game, the bet areas being for placing a chip to bet to a result of the game, the chip integrally including an RFID tag having identification information including a virtual value of virtual currency written to be readable;

an RFID reader disposed below the upper face of the game table to be opposed to each bet area, the RFID reader being configured to read the identification information from the RFID tag of the chip placed in the bet area; and a projector disposed in a space above the game table, the projector being configured to project a game board image on the upper face of the game table so as to correspond to the game area and the bet areas, wherein:

the game table includes:

a lower layer supported at a predetermined height position by a lower support column; and an upper layer stacked in a replaceable manner on the lower layer in a thickness direction; and the upper layer has a recess in the upper layer to embed the RFID reader.

2. The table game device according to claim 1, wherein the projector is disposed substantially at a center and above the game table.

3. The table game device according to claim 1, wherein the projector projects a line image.

4. The table game device according to claim 1, wherein the projector displays an effect image of a total value of a bet based on the identification information read from the RFID tag of one or a plurality of chips placed in the bet area at a position corresponding to the bet area.

5. The table game device according to claim 1, wherein the RFID reader emits radio waves having a directivity of +90°.

6. The table game device according to claim 1, further comprising:

a memory that stores information for verification that is used for verification of authenticity of the identification information written in the RFID tag of the chip used in a table game; and a verification unit configured to compare the identification information read by the RFID reader with the information for verification stored in the memory for verification.

7. A table game device comprising:

a chip for bet, the chip integrally including an RFID tag having identification information including a virtual value of virtual currency written to be readable;

a game table having an upper face on which at least a game area and bet areas for a predetermined number of players are configured, the game area being for playing a game, the bet areas being for placing the chip to bet to a result of the game;

an RFID reader disposed below the upper face of the game table to be opposed to each bet area, the RFID reader being configured to read the identification information from the RFID tag of the chip placed in the bet area; and a projector disposed in a space above the game table, the projector being configured to project a game board image on the upper face of the game table so as to correspond to the game area and the bet areas wherein:

the game table includes:

a lower layer supported at a predetermined height position by a lower support column; and an upper layer stacked in a replaceable manner on the lower layer in a thickness direction; and the upper layer has a recess in the upper layer to embed the RFID reader.

8. The table game device according to claim 7, wherein the projector is disposed substantially at a center and above the game table.

9. The table game device according to claim 7, wherein the projector projects a line image.

10. The table game device according to claim 7, wherein the projector displays an effect image of a total value of a bet based on the identification information read from the RFID tag of one or a plurality of chips placed in the bet area at a position corresponding to the bet area.

11. The table game device according to claim 7, wherein the RFID reader emits radio waves having a directivity of +90°.

12. The table game device according to claim 7, further comprising:

a memory that stores information for verification that is used for verification of authenticity of the identification information written in the RFID tag of the chip used in a table game; and a verification unit configured to compare the identification information read by the RFID reader with the information for verification stored in the memory for verification.

* * * * *